Sept. 24, 1935.  E. RIEGER  2,015,127
PLANT FOR CONVEYING LIQUIDS
Filed Jan. 13, 1933  3 Sheets-Sheet 1
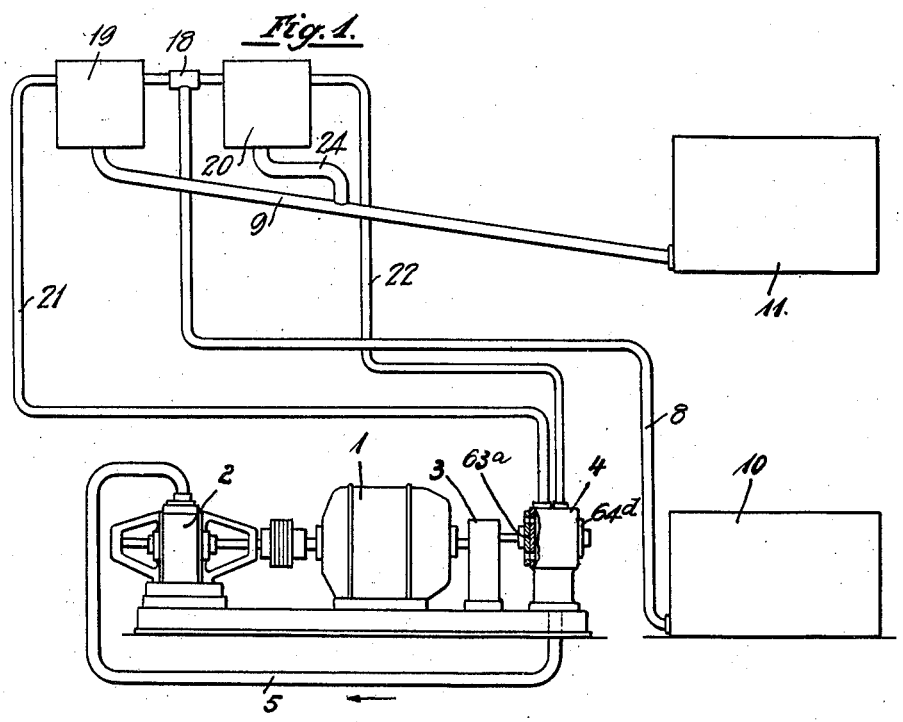
Inventor:
Emil Rieger

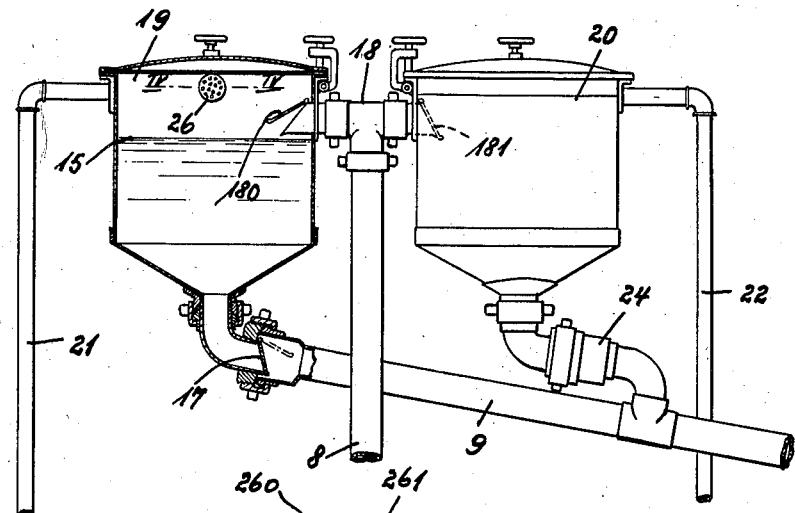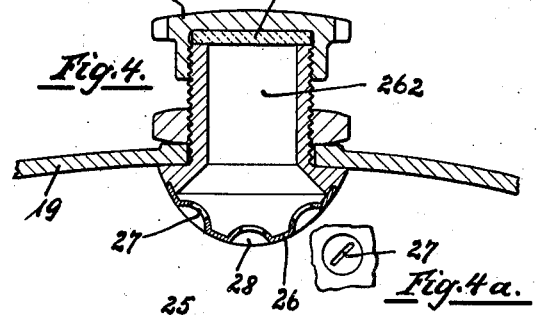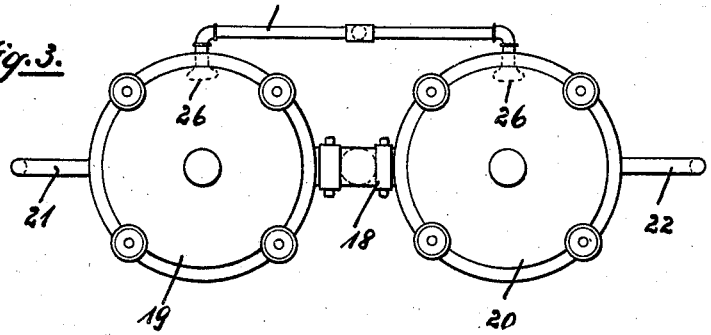

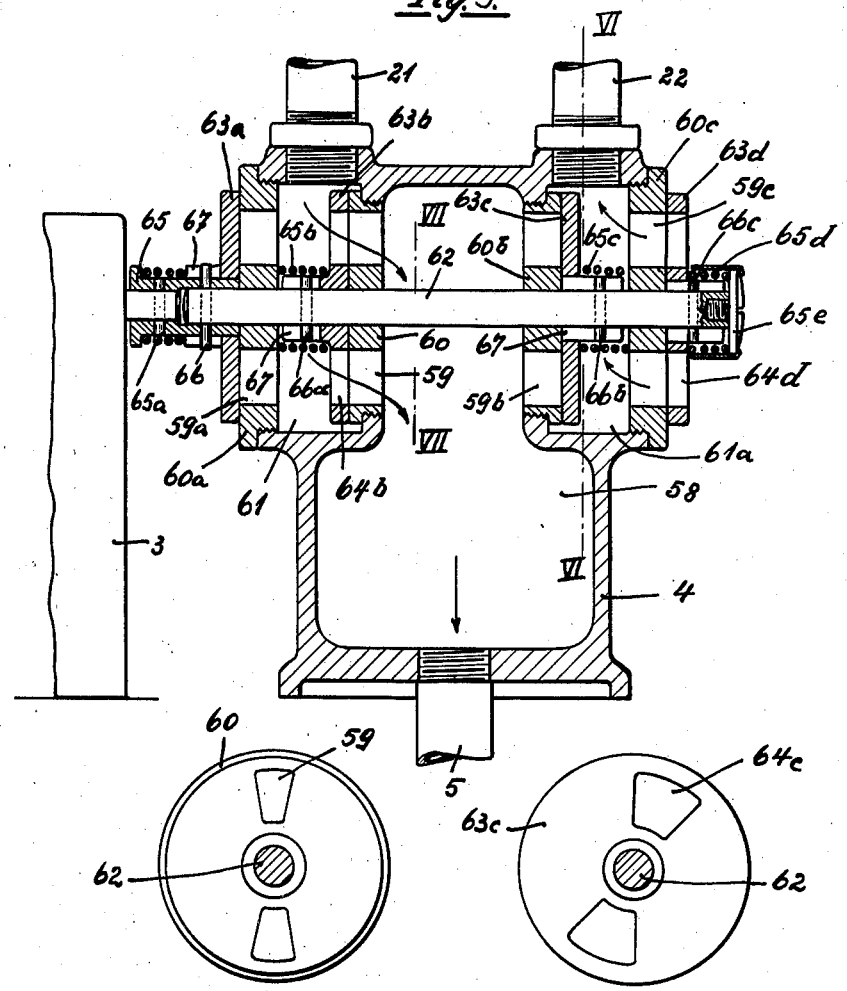

Patented Sept. 24, 1935

2,015,127

UNITED STATES PATENT OFFICE 2,015,127

PLANT FOR CONVEYING LIQUIDS

Emil Rieger, Aalen, Germany

Application January 13, 1933, Serial No. 651,517
In Germany January 18, 1932

1 Claim. (Cl. 103—236)

My invention relates to plants for conveying liquids and more particularly to a time control for plants conveying liquids such as milk and liquid milk products which have a tendency to foam and to entrain air and other gaseous impurities. If such liquids are not moved very steadily, this tendency may result in an unfavorable and undesired change in the structure, the mixture ratio, the composition, and other properties of the liquids or mixtures of liquids.

It is an object of my invention to provide an improved time control for the continuous operation of a plant as described. To this end, I provide a pair of vacuum tanks for receiving a portion of the liquid to be conveyed. The capacity of each tank is small as compared with the amount of liquid to be conveyed per hour, and the liquid is not subjected to the direct action of a reciprocating or rotary pump but to the action of reduced pressure produced by such pump. Plants of this kind are old in the art of conveying milk and liquid milk products but have huge vacuum tanks of such capacity as to receive about one half of the quantity of milk handled in a dairy per day. The initial cost of such vacuum tanks is prohibitive for most dairies. In my plant, on the other hand, two small vacuum tanks are provided for alternating operation. Whirling movement of the liquid at its inflow is inevitable but not only harmless but even desirable as it causes intense degasification of the liquid. Foaming, however, is prevented as the vacuum in the individual tanks is constant and the liquid therefore flows very steadily.

In combination with the two vacuum tanks, I provide a vacuum pump and a pulsator casing. The pulsator casing is subdivided into an inner suction chamber which is connected to the pump, and into two outer suction compartments at opposite sides of the suction chamber. The inner ends of the compartments are connected to the suction chamber and the outer ends of the compartments are open to atmosphere. Each suction compartment is connected to the upper portion of the corresponding vacuum tank by a pipe and is equipped with two slotted valve plates. The inner one of the slotted valve plates in each suction compartment is placed between the inner end of the compartment and the suction chamber, and the outer one is at the outer end of its suction compartment where the compartment is open to atmosphere. A rotary slotted valve is fitted on each valve plate, and the valves are rotated from the pump. The two vacuum tanks are connected to a rising pipe by a branch pipe. The opening of the branch pipe in each tank is controlled by an inwardly opening check valve for preventing return flow. Each tank has an outlet at the bottom which outlets are connected to an outflow pipe. Each outlet is equipped with a check valve opening in the direction of the outflow from each outlet.

By these means, the liquid is conveyed continuously by alternately connecting one of the tanks to the vacuum chamber in the pulsator, and to atmosphere. The liquid is degasified but does not foam. The small vacuum tanks are evacuated more easily and at shorter time intervals, they are more easily kept tight and are more easily cleaned than large ones.

In the drawings affixed to this specification and forming part thereof, a plant embodying my invention, and its pulsator, are illustrated diagrammatically by way of example.

In the drawings:

Fig. 1 is a diagram of the plant,

Fig. 2 is a partly sectional elevation showing its two suction tanks for continuous operation, Fig. 3 is a plan view of Fig. 2, Fig. 4 is a section on the line IV—IV in Fig. 2, drawn to a larger scale and showing a spray nozzle for cleaning a vacuum tank, Fig. 4a is a detail of the nozzle, Fig. 5 is an axial section of a pulsator for the time control, Figs. 6 and 7 are sections on the corresponding lines in Fig. 5.

Referring now to the drawings, and first to Fig. 1, I is a motor, here shown as an electric motor by way of example, 2 is a pump on the shaft of the motor, 3 is a reduction gear operatively connected to the motor shaft, and 4 is a pulsator which is operated by the gear 3.

5 is the suction pipe of the pump. The suction pipe is connected to the suction chamber 58 of the pulsator 4 at its rear end. 19 and 20 are vacuum tanks for alternating operation which are connected to a supply reservoir 10 by a rising pipe 8 and a branch pipe 18, with check valves 180 and 181 at its openings in the respective tanks 19 and 20. Two individual vacuum pipes 21 and 22 are connected to the pulsator 4, as will be described with reference Figs. 5 to 7. 9 is a downflow pipe which is connected directly to the tank 19 and equipped with the valve 17. 24 is a branch pipe connecting the tank 20 to the downflow pipe 9, and a valve (not shown) like the valve 17 is provided in the branch pipe.

In the position of parts illustrated in Fig. 2, the vacuum tank 19 is under suction, the valve 180 being open and admitting liquid from the supply tank 10, Fig. 1, until the tank 19 has been filled to the desired level 15. At this moment, the time pulsator 4 admits atmospheric air to the tank 19 through vacuum pipe 21, breaking up the vacuum therein. Valve 180 closes and valve 17 opens, discharging the liquid in the tank 19 into the collecting reservoir 11 through pipe 9. While the liquid is discharged from tank 19, a fresh charge is drawn into the tank 20 under the action of the vacuum in the pipe 22, etc., so that the plant operates continuously.

Means are preferably provided for facilitating the cleaning of the vacuum tank, or tanks, and such means will now be described with reference to Figs. 3 and 4. 25 is a pipe which is connected to a supply of washing liquid, such as water, and at its ends opens into the two tanks 19 and 20. Preferably the ends are equipped with spray nozzles 26 for subdividing uniformly the cleaning medium, such as hot water, steam or the like, so that it is effectively applied to the walls of the tanks.

As illustrated in Fig. 3, the pipe 25 is permanently connected to a supply of cleaning medium, but a detachable connection may also be provided and will be described with reference to Fig. 4. 260 is a threaded cap with a washer 261 of rubber or the like on the outer end of a threaded pipe 262 in the wall of a tank, for instance, the tank 19 in Fig. 2, while the spray nozzle 26 is secured to the inner end of the pipe 262. The spray nozzle preferably has elongated holes or slots 27, Fig. 4a, at the bottom of spherical or paraboloid depressions 28 which are so arranged and directed as to emit jets of cleaning medium in all directions.

Referring now to Figs. 5 to 7, 58 is a suction chamber in the casing of the pulsator 4 to which the suction pipe 5 of the pump 2 is connected at the bottom. 61 and 61a are suction compartments at the top of the chamber 58. The compartment 61 is connected to the vacuum pipe 21 and the compartment 61a is connected to the vacuum pipe 22. The vacuum compartment 61 at the right has an inner valve plate 60, with slots 59, and an outer valve plate 60a, with slots 59a. The valve plates are secured in the walls of the compartment by shouldered and threaded portions. 62 is a shaft which extends centrally through the compartments 61 and 61a, and 65, 66 is a clutch by which the shaft of the reduction gearing is connected to the shaft 62. 63a is a rotary valve which is mounted to rotate on the outer face of the valve plate 60a, and 63b is a rotary valve which is mounted to rotate on the inner face of the valve plate 60. The rotary valves are slotted as shown at 64b for the valve 63b. The other compartment 61a is similarly equipped, having fixed valve plates 60b and 60c, with slots 59b and 59c, respectively, and rotary valves 63c and 63d, with slots such as shown at 64d. The rotary valves 63a, 63b, 63c and 63d are connected to the shaft 62 by the ends of the clutching pins 66 which engage in slots 67 in the boss of the rotary valve 63a, and similar pins 66a, 66b and 66c also engaging in slots of the bosses of valves 63b, 63c and 63d, respectively. In this manner, the rotary valves are mounted for axial displacement on the shaft 62, and 65a, 65b, 65c and 65d are springs on the shaft 62 for applying the rotary valves to the respective plates so as to make a tight fit thereon. 65e is a washer on the rear end of the shaft 62 on which the last spring 65d is abutted.

The slots in the several rotary valves must obviously be arranged in accordance with a definite system. Thus, in the example illustrated, the valve 63a closes the suction compartment 61 against the access of atmospheric air while the slots 64b in the valve 63b register with the slots 59 in the valve plate 60, so that the vacuum pipe 21 is connected to the suction pipe 5, and the vacuum tank 19, is placed under the suction of pipe 5. In the compartment 61a, the valve 63c closes the connection of the compartment to the chamber 58 while the valve 63d connects the vacuum pipe 22 of tank 20 to atmosphere, as indicated by the arrows.

I wish it to be understood that I do not desire to be limited to the exact details of construction shown and described for obvious modifications will occur to a person skilled in the art.

I claim:—

In a plant for conveying milk and liquid milk products, in combination, a pair of vacuum tanks for receiving a portion of the liquid to be conveyed, the capacity of each tank being small as compared with the amount of liquid to be conveyed per hour, a vacuum pump, a pulsator casing subdivided into an inner suction chamber and two outer suction compartments at opposite sides of said chamber and connected thereto at their inner ends, while their outer ends are open to atmosphere, a pipe connecting said suction chamber to said pump, a pipe connecting each suction compartment to the upper portion of the corresponding tank, an inner slotted valve plate in each suction compartment between the compartment and the suction chamber, an outer slotted valve plate at the outer end of each suction compartment, a rotary slotted valve on each inner, and a rotary slotted valve on each outer valve plate, means operatively connected to said pump for rotating said valves, a rising pipe, a branch pipe connecting said rising pipe to each tank, an inwardly opening check valve at the opening of said branch pipe in each tank, an outlet at the bottom of each tank, an outflow pipe connected to said outlets, and a check valve opening in the direction of outflow in each outlet.

EMIL RIEGER.